Oct. 29, 1963
L. D. DUNN
3,108,690
HOLDER
Filed June 11, 1962
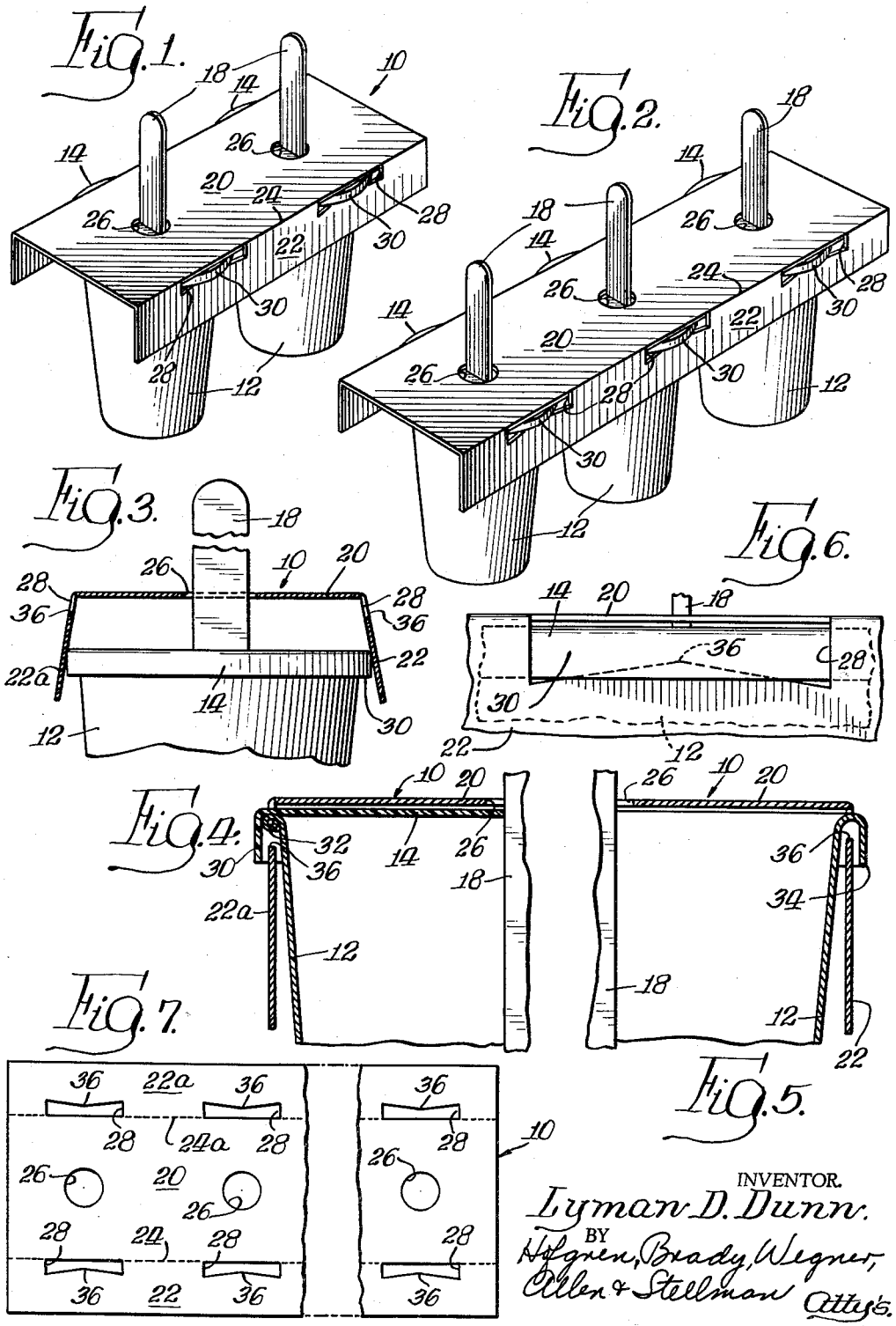
INVENTOR.
Lyman D. Dunn.
BY
Hofgren, Brady, Wegner,
Allen & Stellman
Atty's.

United States Patent Office 3,108,690
Patented Oct. 29, 1963

3,108,690
HOLDER
Lyman D. Dunn, Chicago, Ill., assignor to Marlan Company, a corporation of Illinois
Filed June 11, 1962, Ser. No. 201,537
1 Claim. (Cl. 206—65)

This invention relates to holders for beverage containers and more particularly to a light weight disposable holder adapted to hold a plurality of beverage containers for carrying or storing and which can be thrown away after use.

Various forms of beverage products, such as malted milk, soft drinks, coffee, or frozen beverage preparations are frequently sold at mass vending stands, such as roadside drive-ins, ball parks, or drive-in theatre stands, from which they must be carried an appreciable distance to a place where they will be consumed. These products are usually sold in disposable containers, such as paper cups, and are not easily carried or stored, especially when purchased in substantial numbers as is often the case with such products. In the case of some frozen beverage products which have a holding stick projecting upwardly from the cover, transportation and storage may be even more cumbersome.

The device of this invention is designed to provide an inexpensive disposable holder for such beverage containers. This holder may be adapted to secure only the given number of beverages purchased. Furthermore, this holder is easily stored prior to use by the vendor, is of simple material and configuration so that manufacture and cost thereof, is inexpensive.

It is therefore an object of this invention to provide a holder such as that described.

It is another object of this invention to provide such a holder which may be adapted for use with soft drink containers or frozen beverage containers which have a holding stick projecting upwardly from their cover to provide a convenient package for storing a given quantity of such containers.

It is still a further object of this invention to provide a holder for beverage containers having locking surfaces spaced circumferentially from the side walls thereof which are adapted to lock in gripping means formed in side members of the holder which are positioned adjacent to the side walls of the containers and are joined by a main body portion extending across the top of the containers to provide a convenient package for carrying or storing a plurality of such beverage containers while holding the said containers against movement relative thereto.

Other objects and advantages of this invention will become apparent from the following description taken together together with the accompanying drawings.

Of the drawings:

FIGURE 1 is a perspective view showing the holder of this invention in use with two frozen beverage containers of the type having a gripping stick extending upwardly from the covers;

FIGURE 2 is a perspective view similar to FIGURE 1 showing the holder of this invention for use with three such frozen beverage containers;

FIGURE 3 is a fragmentary view in partial section showing the method of securing the containers to the holder;

FIGURE 4 is a fragmentary section view through the holder, the container lid and the container showing the relation of the components when the container is locked in the holder;

FIGURE 5 is a view similar to FIGURE 4 illustrating the use of the holder with a modified container which is not covered with a lid;

FIGURE 6 is an enlarged fragmentary view of a portion of the device of this invention showing in detail the locking relation of the holder with the container lid; and FIGURE 7 is a partially broken top plan view of the holder of this invention prior to being adapted for use with a plurality of beverage containers.

Referring now to the drawings, in FIGURES 1 and 2 the holder 10 of this invention is shown for use with combinations of two or three beverage containers 12. The containers 12 illustrated in FIGURES 1 and 2 are containers for frozen beverage products which are adhered to a stick 18 partially embedded in the frozen product and partially extended upwardly out of the container cover 14 through a slot 16 therein. It is to be understood that this holder may be used with conventional liquid beverage containers having a cover similar to that illustrated or having a modified opening without a cover as will be explained in detail later.

The holder 10 is a thin flat unitary member generally rectangular in configurtaion and made of relatively stiff inexpensive materials such as a paper derivative or the like. The holder includes a main body portion 20 positioned between a pair of spaced side portions 22 and 22a extending longitudinally of the holder. The side members 22 and 22a are separated from the body portion 20 by fold lines 24 and 24a, respectively, about which the members 22 and 22a are foldable to form a channel and partially encase beverage containers therebetween. When so folded the side members are positioned closely adjacent to the peripheries of the side walls of the containers 12 and urge the containers into linear alignment as shown in FIGURES 1 and 2.

A series of container gripping means or slots 28 of generally rectangular configuration are formed in the side member portions 22 and 22a along the fold lines 24 and 24a, respectively. The slots 28 are formed in opposed pairs along the lengths of the two side members. The body portion 20 is made narrower than the diameter of the open ends of the containers to be secured to the holder so that portions of the peripheries of the open ends project outwardly through the slots when the side members are folded downwardly to encase the containers therebetween. Each pair of slots 28 is adapted to cooperate with each container locking means 30 formed on the lids 14 of the containers 12, or, where there are no lids for the containers, with each container locking means 34 formed integrally with the container, to lock each of the containers in the holder and secure them against movement relative thereto. A plurality of openings 26 may be formed centrally in the body portion 20 between each pair of laterally spaced slots 28 to permit the sticks 18 of frozen beverage containers to pass therethrough.

Container locking means 30 is a downwardly extending flange or lip formed on the lid 14 which is concentrically spaced from the side walls of the container 12 and fits over the container bead 32 in sealing engagement therewith. Container locking means 34 is a modification of the bead 32 comprising a downward extension of the bead forming an integral concentric downwardly extending flange or lip at the top portion of the container 12 and circumferentially spaced therefrom. Either locking means 30 or 34 is adapted to cooperate with the anchoring means 36 in the slot 28 to secure the containers thereto.

Anchoring means 36 is defined by one side of the slots 28 having generally an inverted V-shaped configuration which, when the side members 22 and 22a are folded downward about their fold lines 24 and 24a, is the bottom side of the slots 28. Such a V-shaped con figuration allows the slots in the side walls to snap over the locking portions 30 of the lids 14 so its vertex of its V extends up under the locking portion 30 and urges the containers up against the bottom of the body portion 20 of the shoulder. This urging locks the containers against substantial vertical movement relative to the holder. The portion of the vertex of the V which extends under the locking means is of greater dimension than the distance between the top of the container and the holder thus cooperating therewith to retain the container therein. The closely adjacent position of the side members with the container walls holds the containers against lateral movement about an axis transverse to the longitudinal extent of the holder 10. Because the slots are formed with one side coinciding with the fold lines about which the side members are folded relative to the body portion and the other side of the longitudinal slot has the aforementioned V-shaped configuration, the containers are urged into facial engagement with the underside of the body portion 20 securing the containers against movement about an axis parallel to the longitudinal axis of the holder 10.

The holders of this invention may be made in generally flat strips, as shown in FIGURE 7, of a length capable of accommodating a plurality of liquid containers. By merely cutting off a portion of the strip by appropriate means, such as scissors, a holder member may be made which has the exact number of slots 28 and holes 26 for the number of containers desired to be held therein. Thus, if it is desired to package the containers, as shown in FIGURE 1, a portion may be cut off which has two pairs of slots 28 and holes 26, or, if it is desired that three containers be packaged, as shown in FIGURE 2, that portion may be cut which has three pairs of slots 28 and three holes 26. It is also possible that the holder 10 could be made in elongate strips having spaced transverse lines of weakening defining individual holder units which may be easily torn from the strips.

The first step in securing the liquid containers 12 to the holder 10 is to fold down the side members 22 and 22a along the fold lines 24 and 24a. Then, as shown in FIGURE 3, the holder is placed over the top of a series of containers and brought downwardly thereupon with the side members 22 and 22a flaring slightly outward. As the body portion 20 of the holder approaches the cover 12 of a container, the slots 28 become generally aligned with the locking means 30. At that point the locking means protrudes out of the slot 28 and the anchoring means 36 of the slots cams underneath the lip of the locking means securing the container within the holder.

The location and configuration of the slots 28 cooperate to lock the containers 12 within the holder 10 and secure them against substantial movement relative thereto. Furthermore, the containers are so held so that the bottom portions are free and lie in the same plane for containers of uniform size. Thus a plurality of containers which are secured within the holder 10 may be conveniently placed or stored by merely placing the containers at rest on a planar surface. This is particularly helpful when the containers may contain a frozen beverage preparation which has sticks 18 emanating from the top thereof. Furthermore, a customer at a refreshment stand who often only has one hand free to carry beverage products will find this an extremely easy way to carry a plurality of beverage containers and set them down with one hand when his destination has been reached.

The foregoing description has been given for clearness of understanding only, and no unnecessary limitations should be understood therefrom, for some modifications will be obvious to those skilled in the art.

I claim:

Means for holding a plurality of beverage containers in an upright relation comprising, in combination: a plurality of beverage containers, each having an open end and a lid therefor, said lids having downwardly extending flange portions providing locking means circumferentially spaced from the open ends of said container; a generally rectangular unitary holder member having a pair of parallel spaced continuous fold lines formed therein dividing said member into a body portion and a pair of spaced side members foldably joined thereto; said body portion being narrower than the open ends of said containers and adapted to be positioned over said open ends, said side members being foldable about said fold lines to be closely adjacent the peripheries of said containers for urging said containers into linear alignment; container grasping means comprising a pair of spaced slots formed in said side members for each container to be held, said slots having one side coincident with said fold line and the side opposite said fold lines lying in said side members and having a wide angle V-shaped configuration, said slots adapted to grasp said lid flange portion so that the vertex of the V extends up under the flange portions to lock said lids in said slots and urge said container against the body portion of said holder to secure the containers in an upright position therein; and a plurality of openings in said body portion in alignment with each pair of spaced slots to adapt said holder for use with containers having a stick extending upwardly through said lids.

References Cited in the file of this patent

UNITED STATES PATENTS

| | | |
|---|---|---|
| 2,737,326 | Toensmeier | Mar. 6, 1956 |
| 2,854,183 | Srofe | Sept. 30, 1958 |
| 2,965,410 | Hughes | Dec. 20, 1960 |
| 2,986,272 | Kruse | May 30, 1961 |